United States Patent [19]
Schreck

[11] Patent Number: 5,861,208
[45] Date of Patent: Jan. 19, 1999

[54] SEALABLE MULTILAYER POLYOLEFIN FILM CONTAINING HOLLOW PARTICLES PROCESS FOR ITS PRODUCTION AND ITS USE

[75] Inventor: Michael Schreck, Frankfurt, Germany

[73] Assignee: Hoechst Aktiengesellschaft, Germany

[21] Appl. No.: 618,857

[22] Filed: Mar. 20, 1996

[30] Foreign Application Priority Data

Mar. 20, 1995 [DE] Germany .......... 195 10 086.7

[51] Int. Cl.$^6$ ...................... B32B 5/16
[52] U.S. Cl. ............ 428/327; 428/516; 524/81
[58] Field of Search .................. 428/327, 516; 524/81

[56] References Cited

U.S. PATENT DOCUMENTS 4,698,261  10/1987  Bothe et al. .................. 428/204
5,182,168  1/1993  Chu ........................... 428/330

FOREIGN PATENT DOCUMENTS 8920859  4/1989  WIPO .

Primary Examiner—Hi Thi Le
Attorney, Agent, or Firm—Connolly & Hutz

[57] ABSTRACT

Sealable multilayer polyolefin film containing hollow particles, process for its production and its use An oriented polyolefin film is described. It contains at least one polyolefinic base layer and one polyolefinic sealable top layer. The top layer contains hollow particles which comprise essentially a polymer which is incompatible with the polyolefin of the top layer.

A process for the production of the film and its use are also described.

19 Claims, No Drawings

SEALABLE MULTILAYER POLYOLEFIN FILM CONTAINING HOLLOW PARTICLES PROCESS FOR ITS PRODUCTION AND ITS USE

DESCRIPTION

Sealable multilayer polyolefin film containing hollow articles, process for its production and its use The invention relates to an oriented polyolefin film which contains at least one polyolefinic base layer and one sealable polyolefinic top layer. The films are distinguished by high gloss and a low coefficient of friction. The invention furthermore relates to the use of hollow particles.

The prior art describes films having a low coefficient of friction. The requirements with regard to the processability of the films and their running properties on automatic machines have constantly increased in the course of the years. Increasingly low coefficients of friction are therefore required, the term "low" now including coefficients of friction of an order of magnitude of from 0.3 to 0.1, whereas a few years ago a coefficient of friction of from 0.4 to 0.5 was considered to be outstandingly low.

DE-A-20 01 032 describes films of various thermoplastics whose frictional properties are improved by the addition of carboxamides and antiblocking agents. Since it is not possible to incorporate a sufficient amount of lubricant into the top layers alone, the additional incorporation of the amides into the base layer is recommended. These films have a coefficient of friction in the range from 0.4 to 0.8 and thus no longer meet the present quality requirements.

U.S. Pat. No. 4,117,193 describes multilayer films comprising a polypropylene base layer which contains a lubricant and an antiblocking agent and an antistatic agent. The top layer of these films comprises a polymer blend and additionally contains a lubricant and an antiblocking agent. The polymer blend comprises an ethylene/butylene polymer and a polyolefinic resin, such as HDPE or LDPE. It is stated that the poor frictional properties of the films cannot be sufficiently improved simply by adding lubricants and antiblocking agents. For this reason, the top layer is modified by adding HDPE or LDPE in combination with a lubricant and antiblocking agent. According to the Examples and Comparative Examples, the reduction of the coefficient of friction is attributable essentially to the addition of HDPE. Pure copolymer top layers having the same composition of additives have coefficients of friction of from 0.7 to 0.8. The films combine outstanding coefficients of friction with good printability. However, owing to the addition of the friction-reducing polyolefin resin, they are greatly in need of improvement with regard to the haze and gloss.

EP-A-0 402 100 describes polypropylene films which contain from 0.01 to 0.5% by weight of a spherical $SiO_2$ and from 0.3 to 5% by weight of a glyceride of hydroxy-fatty acid. This invention relates to single-layer and multilayer films. Multilayer embodiments have the combination of $SiO_2$ and glyceride both in the top layer and in the base layer. It is stated that the chosen amounts of $SiO_2$ and glyceride are essential for the advantageous properties of the films, and deviations from these ranges no longer lead to the desired result. The films are distinguished by good transparency, frictional properties and adhesion to metal. However, after a relatively long storage time, they exhibit a surface deposit which impairs the appearance of the films. This effect is also known as "blooming" and is caused by the migration of certain additives, in particular the glycerides, to the surface of the films.

EP-A-0 182 463 describes a multilayer film which contains from 0.05 to 0.2% by weight of tertiary aliphatic amine in the base layer and a combination of silicone oil and $SiO_2$ in the sealable top layer. According to the description, films having coefficients of friction of 0.3 or less are obtained as a result of the surprising interaction of $SiO_2$, silicone oil and amine in combination with a chosen top layer thickness of less than 0.8 μm. In spite of this outstanding coefficient of friction, the processing properties of the film are poor. In particular, it is not printable and is therefore unsuitable for many applications.

EP-A-0 143 130 discloses films which contain a carboxamide in the base layer and likewise a combination of silicone oil and $SiO_2$ in the top layer. As in the abovementioned EP-A-0 182 463, a synergistic effect of the three chosen components on the coefficient of friction is described. In spite of their advantageous frictional properties, these films too have poor processability. They too lack the important property of printability.

EP-A-0 242 055 describes the use of a nonfusible organosiloxane resin powder having a three-dimensional network structure as an antiblocking agent in films. Both the silicone resin and the propylene polymer are used in the form of a powder which comprises particles having a virtually spherical shape, this particle shape being characterized by an appropriate equation for the actual sphericity. The films are to have improved transparency, antiblocking properties, frictional properties and appearance compared with the prior art. The mixture of propylene and antiblocking agent can also be used as top layer material for coextruded multilayer films. However, these coextruded multilayer films are still in need of improvement with regard to their transparency and their gloss, particularly when the top layers are applied in conventional thicknesses of more than 0.5 μm. Moreover, this antiblocking agent is very much more expensive than conventional antiblocking agents.

German Patent Application P 43 06 154.0 describes the use of an organically coated $SiO_2$ as an antiblocking agent in sealable films. The coefficient of friction and the processing behavior of the film are improved. This publication provides no information about the three-dimensional shape of the antiblocking particles.

EP-A-0 353 368 describes the use of the siloxane resin powder described in EP-A-0 242 055, in conjunction with a glyceride of a hydroxy-fatty acid. These films are particularly suitable for coating by vapor deposition under reduced pressure but have very poor gloss and transparency.

When the known teachings were applied, it was found that some known antiblocking agents have adverse effects on certain film properties. The antiblocking agent impairs the transparency and the gloss of the film. The improvement in the friction is generally accompanied by an increase in the surface roughness. $SiO_2$ as an antiblocking agent leads to deposits on the die lip and to abraded material on the rolls during the production of the films. Consequently, the die lip and the rolls must be cleaned frequently since the film otherwise runs poorly during production and the deposits on the die lip lead to streakiness on the film. In addition, problems are encountered during the corona treatment. The corona treatment passes through at those points of the roll which are contaminated with abraded $SiO_2$ and leads to the undesirable so-called back effect, with the result that defects which may attract complaints occur during further processing of the film, for example printing or metallization.

It was the object of the present invention to avoid the disadvantages of the films previously described in the prior art. In particular, it is intended to provide a multilayer film which is distinguished by a combination of the following properties:

high gloss little haze in the case of transparent base layers a low coefficient of friction little surface roughness The object of the invention is achieved by a multilayer film of the generic type stated at the outset whose defining feature is that the top layer contains hollow particles which essentially comprise a polymer which is incompatible with the polyolefin of the top layer.

The base layer of the multilayer film according to the invention contains essentially a polyolefin, preferably a propylene polymer, and, if required, further additives in effective amounts in each case. In general, the base layer contains at least 50% by weight, preferably from 75 to 100% by weight, in particular from 90 to 100% by weight, of the propylene polymer.

The propylene polymer contains from 90 to 100% by weight, preferably from 95 to 100% by weight, in particular from 98 to 100% by weight, of propylene units and has a melting point of 120° C. or higher, preferably from 150° to 170° C., and in general a melt flow index of from 0.5 g/10 min to 8 g/10 min, preferably from 2 g/10 min to 5 g/10 min, at 230° C. and a force of 21.6N (DIN 53 735). Isotactic propylene homopolymer having an atactic fraction of 15% by weight or less, copolymers of ethylene and propylene having an ethylene content of 10% by weight or less, copolymers of propylene with $C_4$–$C_8$-α-olefins having an α-olefin content of 10% by weight or less, terpolymers of propylene, ethylene and butylene having an ethylene content of 10% by weight or less and having a butylene content of 15% by weight or less are preferred propylene polymers for the core layer, isotactic propylene homopolymer being particularly preferred. The stated percentages by weight are based on the particular polymer.

A mixture of the stated propylene homo- and/or copolymers and/or terpolymers and/or other polyolefins, in particular of monomers having 2 to 6 carbon atoms, is also suitable, the mixture containing at least 50% by weight, in particular at least 75% by weight, of propylene polymer. Suitable other polyolefins in the polymer mixture are polyethylenes, in particular HDPE, LDPE and LLDPE, the amount of the polyolefins in each case not exceeding 15% by weight, based on the polymer mixture.

In general, the base layer may contain lubricants, antistatic agents, stabilizers and/or neutralizing agents in the effective amounts in each case, and, if required, hydrocarbon resin.

In a white or opaque or white/opaque embodiment, the base layer additionally contains pigments or vacuole-initiating particles or a combination of these. Such films have a light transmittance according to ASTM-D 1033-77 of not more than 70%, preferably of not more than 50%.

Pigments comprise those particles which essentially do not lead to vacuole formation during stretching. The coloring effect of the pigments is due to the particles themselves. The term "pigment" is in general associated with a particle size of from 0.01 to not more than 1 μm and covers both so-called "white pigments", which render the films white, and "colored pigments", which impart a color to the film or render it black. In general, the mean particle diameter of the pigments is in the range from 0.01 to 1 μm, preferably from 0.01 to 0.7 μm, in particular from 0.01 to 0.4 μm. The base layer contains pigments in general in an amount of from 1 to 25% by weight, in particular from 2 to 20% by weight, preferably from 5 to 15% by weight, based in each case on the base layer.

Conventional pigments are materials such as, for example, alumina, aluminum sulfate, barium sulfate, calcium carbonate, magnesium carbonate, silicates, such as aluminum silicate (kaolin) and magnesium silicate (talc), silica and titanium dioxide, among which white pigments, such as calcium carbonate, silica, titanium dioxide and barium sulfate are preferably used.

The titanium dioxide particles comprise at least 95% by weight of rutile and are preferably used with a coating of inorganic oxides, as usually used as a coating for $TiO_2$ white pigment in papers or coating materials for improving the lightfastness. The particularly suitable inorganic oxides include the oxides of aluminum, silicon, zinc or magnesium or mixtures of two or more of these compounds. They are precipitated from water-soluble compounds, for example alkali metal aluminate, in particular sodium aluminate, aluminum hydroxide, aluminum sulfate, aluminum nitrate, sodium silicate or silicic acid in aqueous suspension. $TiO_2$ particles having a coating are described, for example, in EP-A-0 078 833 and EP-A-0 044 515.

If required, the coating also contains organic compounds having polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrogensiloxanes, such as polydimethylsiloxane and polymethylhydrogensiloxane.

The coating on the $TiO_2$ particles usually comprises from 1 to 12 g, in particular from 2 to 6 g, of inorganic oxides, if required additionally from 0.5 to 3 g, in particular from 0.7 to 1.5 g, based in each case on 100 g of $TiO_2$ particles, of organic compounds additionally being present. It has proven particularly advantageous if the $TiO_2$ particles are coated with $Al_2O_3$ or with $Al_2O_3$ and polydimethylsiloxane.

Opaque embodiments of the films contain vacuole-initiating particles which are incompatible with the polymer matrix and lead to the formation of vacuole-like cavities during stretching of the films, the size, type and number of vacuoles being dependent on the material and on the size of the solid particles and on the stretching conditions, such as stretching ratio and stretching temperature. The vacuoles give the films a characteristic pearlescent, opaque appearance which is produced by light scattering at the vacuole/polymer matrix interfaces. In general, the mean particle diameter of the vacuole-initiating particles is from 1 to 6 μm, preferably from 1.5 to 5 μm. The base layer contains vacuole-initiating particles in general in an amount of from 1 to 25% by weight.

Conventional vacuole-initiating particles of the base layer are organic and/or inorganic materials incompatible with polypropylene, such as alumina, aluminum sulfate, barium sulfate, calcium carbonate, magnesium carbonate, silicates, such as aluminum silicate (kaolin) and magnesium silicate (talc), silica and titanium dioxide, among which calcium carbonate, silica and titanium dioxide are preferably used. Suitable organic fillers are the conventionally used polymers which are incompatible with the polymer of the base layer, in particular those such as HDPE, polyesters, polystyrenes, polyamides, cycloolefin copolymers and halogenated organic polymers, polyesters, such as, for example, polybutylene terephthalates or polyethylene terephthalates, being preferred. For the purposes of the present invention, "incompatible materials or incompatible polymers" means that the material or the polymer is present as a separate particle or as a separate phase in the film.

White/opaque films which are provided with vacuole-initiating particles and with pigment contain the vacuole-initiating particles in an amount of from 1 to 10% by weight, preferably from 1 to 5% by weight, and pigment in an amount of from 1 to 7% by weight, preferably from 1 to 5% by weight.

The density of the opaque or white films may vary within wide limits and depends on the type and the amount of the fillers. The density is in general in the range from 0.4 to 1.1 g/cm$^3$. Pigmented films have a density of the order of magnitude of 0.9 g/cm$^3$ or higher, preferably in the range from 0.9 to 1.1 g/cm$^3$. Films which contain only vacuole-initiating particles have a density of less than 0.9 g/cm$^3$. For packaging films containing from 2 to 5% by weight of vacuole-initiating particles, the density is in the range from 0.6 to 0.85 g/cm$^3$. For films containing from 5 to 14% by weight of vacuole-initiating particles, the density is in the range from 0.4 to 0.8 g/cm$^3$. Films which contain pigments and vacuole-initiating particles have a density in the range from 0.5 to 0.85 g/cm$^3$, depending on the ratio of pigment content to content of vacuole-initiating particles.

The multilayer film according to the invention can, if required, comprise further intermediate layers applied between the base layer and the top layer, or one such intermediate layer. This intermediate layer, or these intermediate layers, which may be present if required contains or contain essentially propylene polymers or polypropylene mixtures, as described above for the base layer. In principle, the base layer and the intermediate layer or layers may be composed of the same or different propylene polymers or mixtures. The melt flow indices of the polymers for the core and intermediate layer or layers should as far as possible be of the same magnitude. If necessary, the MFI of the intermediate layer or layers may be slightly higher, but a difference of 20% should not be exceeded. If required, additives may be introduced into the intermediate layers, in effective amounts in each case.

In a preferred embodiment of the film according to the invention, the propylene polymer of the base layer and/or of the intermediate layer is degraded by peroxide.

A measure of the degree of degradation of the polymer is the so-called degradation factor A, which indicates the relative change in the melt flow index according to DIN 53 735 of the polypropylene, based on the starting polymer.

$$A = \frac{MFI_2}{MFI_1}$$

$MFI_1$=Melt flow index of the propylene polymer before the addition of the organic peroxide $MFI_2$=Melt flow index of the propylene polymer degraded by peroxide In general, the degradation factor A of the propylene polymer used is in a range from 3 to 15, preferably from 6 to 10.

Particularly preferred organic peroxides are dialkyl peroxides, an alkyl radical being understood as meaning the conventional saturated straight-chain or branched lower alkyl radicals having up to six carbon atoms. 2,5-Dimethyl-2,5-di(tert-butylperoxy)hexane and di-tert-butyl peroxide are particularly preferred.

The polyolefin film according to the invention furthermore comprises at least one sealable top layer. This top layer contains essentially sealable polymers of olefins having 2 to 10 carbon atoms and hollow particles comprising polymer and, if required, further additives, in effective amounts in each case. In general, the top layer contains from 75 to <100% by weight, in particular from 90 to 99.5% by weight, of the sealable olefinic polymers.

Examples of such olefinic polymers are a copolymer of ethylene and propylene or ethylene and 1-butylene or propylene and 1-butylene and a terpolymer of ethylene and propylene and 1-butylene and a mixture of two or more of the stated homo-, co- and terpolymers and a blend of two or more of the stated homo-, co- and terpolymers, if necessary mixed with one or more of the stated homo-, co- and terpolymers, random ethylene/propylene copolymers having an ethylene content of from 1 to 10% by weight, preferably from 2.5 to 8% by weight, or random propylene/1-butylene copolymers having a butylene content of from 2 to 25% by weight, preferably from 4 to 20% by weight, based in each case on the total weight of the copolymer, or random ethylene/propylene/1-butylene terpolymers having an ethylene content of from 1 to 10% by weight, preferably from 2 to 6% by weight, and a 1-butylene content of from 2 to 20% by weight, preferably from 4 to 20% by weight, based in each case on the total weight of the terpolymer, or a blend of an ethylene/propylene/1-butylene terpolymer and a propylene/1-butylene copolymer having an ethylene content of from 0.1 to 7% by weight and a propylene content of from 50 to 90% by weight and a 1-butylene content of from 10 to 40% by weight, based in each case on the total weight of the polymer blend, being particularly preferred.

The co- and terpolymers described above have in general a melt flow index of from 1.5 to 30 g/10 min, preferably from 3 to 15 g/10 min, and a melting point in the range from 120° to 140° C. The blend of co- and terpolymers described above has in general a melt flow index of from 5 to 9 g/10 min and a melting point of from 120° to 150° C. All melt flow indices stated above are measured at 230° C. and a force of 21.6N (DIN 53 735).

If necessary, all top layer polymers described above can be degraded by peroxide in the same manner as described above for the base layer, in principle the same peroxides being used. The degradation factor for the top layer polymers is in general in a range from 3 to 15, preferably from 6 to 10.

According to the invention, the sealable top layer contains hollow particles of incompatible polymer, in general in an amount of not more than 5% by weight, preferably from 0.001 to 3% by weight, in particular from 0.002 to 1% by weight, based on the weight of the top layer.

For the purposes of the present invention, hollow particles of incompatible polymers are understood as meaning those particles in which an essentially closed polymer skin surrounds an inner gas-filled or air-filled volume. The enclosed volume and the shape of the particles depend on the incompatible polymer used and on the process for the production of the particles. The size of the enclosed volume and the shape of the particles can in principle vary within wide limits.

In general, the hollow particles have a shape which is derived from round hollow bodies having a constant diameter. These spherical or elliptical basic shapes are in general deformed to a greater or lesser extent by inward-curving regions of the surface (so-called inversions or vaults or "concave surface segments"). Usually, an individual particle has from 0 to 20, preferably from 1 to 15, in particular from 2 to 10, such concave surface segments. The individual concave surface segments may be inverted to a greater or lesser extent so that, in an extreme case, with very few and not very pronounced inversions, the particle is essentially a hollow sphere which has virtually no concave surface segments. The greater the number of concave surface segments and the more pronounced the extent of the inversions, the smaller is the volume enclosed by the polymer skin, so that, in a second extreme case, the inner surfaces of the polymer skin touch one another and the enclosed volume tends toward zero. This extreme case is also referred to as a completely collapsed particle, which then comprises essentially only the polymer skin. These collapsed particles have a very highly folded surface without sharp-edged transitions but with very irregularly shaped inversions. The changes in the direction of the surface are then more than 160° over a length dimension of 0.1 μm on the surface.

In general, the concave surface segments of the particles are vaulted to such an extent that the vaulting is at least 10% of the greatest distance between two surface points of the particle (maximum particle diameter). The vaults are preferably so pronounced that they amount to from 20 to 95%, in particular from 30 to 70%, of the maximum particle diameter.

The distribution of the shapes in a batch of particles may vary within wide limits, i.e. the particles generally do not have a uniform geometry. Batches in which at least 5%, preferably from 10 to 100%, in particular from 60 to 100%, of the particles have at least one concave surface segment, preferably from 1 to 10 such segments, have proven advantageous. Batches containing particles which have vaults which are so pronounced that the inner surfaces of the polymer skin touch one another and the enclosed volume tends toward zero are preferred. The distribution of the shapes can be determined by means of scanning electron micrographs (SEM) of the particles.

The particles may have a smooth or rough surface. This feature can be determined, for example, by investigations under the electron microscope, in particular by scanning electron microscopy (SEM). For this purpose, the particles are prepared and contrasted by standard methods for electron microscopy. Metal coats applied by vapor deposition, for example comprising gold, have proven useful as contrast media for scanning electron micrographs. Smooth surfaces of particles appear in the scanning electron micrographs as homogeneous surfaces having a substantially constant gray shade. Roughness due to defects in the surface are evident from different gray shades. The defects are more than 100 nm away from the mean surface of the particles and are thus orders of magnitude smaller than the irregularities due to the concave surface segments.

The particle diameter of the hollow particles may vary within wide ranges. The preferably used hollow particles have a maximum particle diameter which is in the range from 0.2 to 20 μm, preferably from 1 to 15 μm, in particular from 2 to 10 μm, for at least 90% of the particles.

The particle sizes and their distribution are determined by means of photon correlation spectroscopy (PCS), aerosol spectroscopy and/or electron microscopy (SEM). Details with regard to these methods of determination are described in J. P. Fischer, "Progress in Colloid and Polymer Science", 77, pages 180–194, 1988. The bulk density of the hollow particles is not more than 60%, preferably not more than 30%, in particular not more than 15%, of the density of the polymer used for the production of the hollow particles.

The hollow particles comprise essentially a polymer which is incompatible with the polyolefin of the base layer. Incompatible means that this incompatible polymer is immiscible with the polyolefin and is therefore present as a separate phase, which is readily detectable in scanning electron micrographs or optical micrographs. A mixture of two incompatible polymers has two separate peaks in a DSC record, provided that the two polymers do not by chance have virtually the same glass transition temperature or virtually the same melting point.

In principle, all polymers which are incompatible with the particular matrix polymer used and which can be used in a spray-drying process may be used for the production of the hollow particles, i.e. said polymers should be sufficiently soluble, for example, in a solvent suitable for the particular process. The glass transition temperature $T_G$ or the softening temperature $T_V$ or the melting point $T_M$ of the incompatible polymer should in general be so high that the particle remains substantially dimensionally stable under the temperature conditions usually used during film production, i.e. the $T_G$ or $T_M$ should be at least 5° C., preferably from 15° to 180° C., in particular from 15° to 150° C., above the minimum temperature at which extrusion of the matrix polymer is still possible. Conventional extrusion temperatures in the production of films of polyolefin are in the range from 220° to 400° C., preferably in the range from 230° to 360° C.

When polypropylene is used as the matrix polymer, extrusion is usually effected at a temperature of from 220° to 290° C. The $T_G$ of the polymer which is incompatible with polypropylene should therefore be in the range from 225° to 390° C., preferably from 235° to 360° C.

Specifically, the following incompatible polymers which fulfil the abovementioned conditions are particularly suitable for the production of the hollow particles: syndiotactic polystyrene, polyphenylene sulfide (PPS), polyetherketones (PEK), polyamides (PA), polyethylene terephthalate (PET), polybutylene terephthalate (PBT), polyaramids, polyimides, halogenated polymers, amorphous and semicrystalline cycloolefin polymers and polymers which are prepared by ring-opening polymerization (metathetical polymerization).

The abovementioned polymers are either commercial products which can be used directly in the commercially available form for the production of the hollow particles, for example ®Ultramid from BASF AG (PA), ®Ultradur A from BASF AG (PET), ®Celanex from Hoechst AG (PBT) or ®Fortron from Hoechst AG (PPS), or the corresponding polymers and processes for their preparation are already part of the prior art. Specifically, suitable amorphous cycloolefin polymers are described in EP-A-0 156 464, EP-A-0 286 164, EP-A-0 475 893 and DE-A-40 36 264. Semicrystalline cycloolefin polymers and processes for their preparation are disclosed in EP-A-0 503 422. A corresponding publication for polynorbornenes is U.S. Pat. No. 3,330,815. Metathesis polymers are described in EP-A-0 159 464.

Preferred polymers for the production of the hollow particles are polyethylene terephthalates and polybutylene terephthalates and amorphous and semicrystalline cycloolefin polymers.

Cycloolefin polymers are composed of one or more cycloolefins, the cycloolefins used generally being substituted and unsubstituted cycloalkenes and/or polycycloalkenes, for example, such as bi-, tri- or tetracycloalkenes. The cycloolefin polymers may also be branched. Such products may have a comb or star structure.

Particularly preferred are cycloolefin polymers which contain at least one polycyclic olefin of the following formulae I to VI:

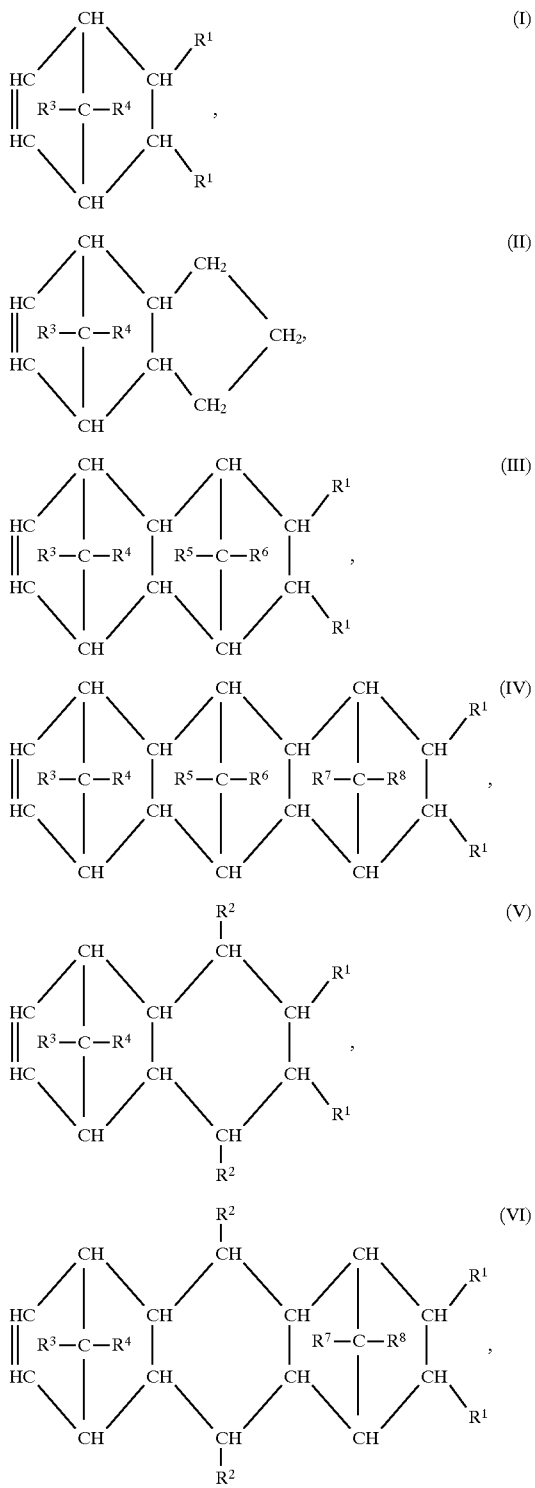

The radicals $R^1$ to $R^8$ in the formulae I to VI may be identical or different and may be H, $C_6$–$C_{20}$-aryl, $C_1$–$C_{20}$-alkyl, F, Cl, Br, I or a monocyclic olefin of the following formula VII

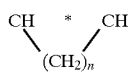

in which n is a number from 2 to 10.

The cycloolefin polymers are preferably prepared with the aid of transition metal catalysts, which are described in the abovementioned publications. Among these, the preparation processes according to EP-A-0 407 870 and EP-A-0 485 893 are preferred.

Cycloolefin polymers which have a medium to high molecular weight in the range from 1000 to 200,000, preferably from 2000 to 180,000, in particular from 3000 to 150,000, are preferred. The molecular weight is regulated in the preparation by the use of hydrogen or a specific choice of the catalyst and of the reaction conditions.

The spray-drying process which is known per se and in which the incompatible polymers are dissolved in a suitable solvent or solvent mixture and the solution is subjected to spray-drying is particularly suitable for the production of the hollow particles. If necessary, other processes, for example emulsion processes or precipitation processes, may also be used for the production of the particles according to the invention (M. Bornschein et al., Die Pharmazie, 44, Issue 9, 1989, page 585 et seq.; Y. Kawashima et al., J. Pharm. Sciences, 81, Issue 2, 1992, page 135 et seq.).

The preparation of the particles by means of spray-drying is preferred and is carried out, for example, according to the nozzle atomization principle. Cocurrent nozzle atomization in which the direction of the atomized solution and the direction of the air or gas stream are identical is preferred. For example, spray driers from Büchi, e.g. Büchi 190 (Büchi GmbH, Eislingen), have proven useful for the production of the particles by this process.

During the spray drying, a solution, emulsion or dispersion of a polymer (sprayed material) is fed into a chamber by means of a delivery pump and is atomized in an air or gas stream so that the solvent is completely or partially removed and the liquid droplets of solution are converted into solid particles. These particles are fed with the air or gas stream into a separator, for example in the form of a cyclone, and are separated off.

The air or gas stream is sucked through the apparatus with the aid of an aspirator so that reduced pressure is generated in the chamber. By regulating the aspirator power, the heated amount of air or gas on the one hand and the reduced pressure prevailing in the apparatus on the other hand are regulated. The amount of air or gas sucked through can be adjusted in the range of 100–800 l (S.T.P.)/h on the apparatus and is also referred to as spray flow. The spray flow is preferably in the range of 500–800 l (S.T.P.)/h. The reduced pressure set is in general in the range of 10–100 mbar, preferably 30–70 mbar, below the pressure outside the apparatus.

To enable the solvent to evaporate during the available contact time in the atomization procedure, the temperature of the air or gas stream must be above or close to the boiling point of the solvent. This temperature of the air or gas stream sucked through is referred to as the inlet temperature. The inlet temperature may vary within wide limits and depends essentially on the solvent used and on the polymer. In general, it is in the range from 15°–250° C., preferably 60°–250° C., in particular 100°–110° C.

The outlet temperature is the temperature of the air or gas stream containing the separated particles before entry into the cyclone. This outlet temperature results from the inlet temperature, aspirator setting and setting of the delivery pump and from the concentration of the spray solution and the heat of vaporization of the solvent. It is in general in the range of 50°–180° C., preferably from 60° to 120° C. It is in general lower than the inlet temperature.

Pump deliveries of from 100 to 500 ml/h, in particular from 120 to 360 ml/h, have proven useful for the delivery pump which feeds the sprayed material into the apparatus.

For example, water, tetrahydrofuran, dichloromethane, toluene, decalin, petroleum ether, furan, DMSO (dimethyl sulfoxide), dioxane, acetone and/or aromatic and/or aliphatic hydrocarbons and mixtures of these solvents are suitable as solvent or solvent mixtures for the preparation of the polymer solution, emulsion or dispersion. The polymer solution, emulsion or dispersion contains in general from 0.2 to 25% by weight, preferably 1–15% by weight, in particular 3–8% by weight, based in each case on the weight of the solution, of polymer. If necessary, the polymer solution may contain further additives in effective amounts in each case, for example emulsifiers.

Depending on the particular process parameters, spherical hollow particles having a few or no concave surface segments or highly deformed particles tend to be obtained. Spherical hollow particles are obtained if the inlet temperature is close to the boiling point of the solvent or below it and at the same time above or close to the $T_G$ of the dissolved polymer. Under these conditions, the solvent is slowly removed and the formation of the spherical shape is promoted. The converse of this principle results in highly deformed particles having a large number of concave surface segments at inlet temperatures which are above the boiling point of the solvent and below the $T_G$ of the polymer.

The multilayer film according to the invention comprises the base layer described above and at least one sealable top layer containing the hollow particles described above and, if required, further layers. Three-layer embodiments which have a top layer on both sides of the base layer are preferred, and said top layers may be identical or different with regard to their thickness and composition. Four- or five-layer embodiments which have the base layer and an intermediate layer or intermediate layers applied to one side or to both sides of the base layer and top layers on both sides are also preferred.

The total thickness of the multilayer polyolefin film according to the invention may vary within wide limits and depends on the intended use. It is preferably from 5 to 250 μm, in particular from 10 to 100 μm, the base layer accounting for about at least 40%, preferably from 50 to 90%, of the total film thickness.

The thickness of the top layer or layers is greater than 0.2 μm and is preferably in the range from 0.3 to 5 μm, in particular greater than from 0.5 to 2 μm, where the top layers on both sides may have identical or different thicknesses.

The thickness of any intermediate layer present, or the thicknesses of any intermediate layers present, independently of one another, is or are from 1 to 12 μm, intermediate layer thicknesses of from 2 to 8 μm, in particular from 3 to 6 μm, being preferred. The stated values are based in each case on one intermediate layer.

In addition to the hollow particles, both the top layer and one of the other layers present may additionally contain neutralizing agents, stabilizers, lubricants, hydrocarbon resins and/or antistatic agents. The following data in percent by weight are based on the eight of the particular layer into which the additive is introduced.

Neutralizing agents are preferably dihydrotalcite, calcium stearate and/or calcium carbonate having a mean particle size of not more than 0.7 μm, an absolute particle size of less than 10 μm and a specific surface area of at least 40 m²/g. In general, the neutralizing agent is added in an amount of from 0.02 to 0.1% by weight.

The conventional stabilizing compounds for ethylene polymers, propylene polymers and other α-olefin polymers may be used as stabilizers. They are added in an amount of from 0.05 to 2% by weight. Phenolic stabilizers, alkali metal/alkaline earth metal stearates and/or alkali metal/alkaline earth metal carbonates are particularly suitable. Phenolic stabilizers are preferred in an amount of from 0.1 to 0.6% by weight, in particular from 0.15 to 0.3% by weight, and with a molecular weight of more than 500 g/mol. Pentaerythrityl tetrakis-3-(3,5-di-tert-butyl-4-hydroxyphenyl)propionate and 1,3,5-trimethyl-2,4,6-tris(3, 5-di-tert-butyl-4-hydroxybenzyl)benzene are particularly advantageous.

Lubricants are higher aliphatic amides, higher aliphatic esters, waxes and metal soaps and polydimethylsiloxanes. The effective amount of lubricant is in the range from 0.1 to 3% by weight. The addition of higher aliphatic amides in the range from 0.15 to 0.25% by weight to the base layer and/or the top layers is particularly suitable. A particularly suitable aliphatic amide is erucamide.

Hydrocarbon resins are low molecular weight polymers whose molecular weight is in general in the range from 300 to 8000, preferably from 400 to 5000, particularly preferably from 500 to 2000. The molecular weight of the resins is thus substantially lower than that of the propylene polymers which form the main component of the individual film layers and in general have a molecular weight of more than 100,000. The hydrocarbon resins are preferably added to the base layer and/or the intermediate layer or layers. The effective amount of low molecular weight resin is from 1 to 20% by weight, preferably from 2 to 10% by weight, based on the layer.

The recommended low molecular weight resin is a natural or synthetic resin having a softening point of from 60° to 180° C., preferably from 80° to 150° C., determined according to ASTM E-28. Among the many low molecular weight resins, the hydrocarbon resins are preferred, in particular in the form of the mineral oil resins (petroleum resin), styrene resins, cyclopentadiene resins and terpene resins (these resins are described in Ullmanns Encyklopädie der technischen Chemie, 4th Edition, Volume 12, pages 525 to 555). Suitable mineral oil resins are described in many publications, such as, for example, EP-A-0 180 087, which is hereby incorporated by reference.

Preferred antistatic agents are alkali metal alkanesulfonates, polyether-modified, i.e. ethoxylated and/or propoxylated, polydiorganosiloxanes (polydialkylsiloxanes, polyalkylphenylsiloxanes and the like) and/or the essentially straight-chain and branched aliphatic, tertiary amines having an aliphatic radical of 10 to 20 carbon atoms, which are substituted by ω-hydroxy-($C_1$–$C_4$)-alkyl groups, N,N-bis(2-hydroxyethyl)alkylamines having 10 to 20 carbon atoms, preferably 12 to 18 carbon atoms, in the alkyl radical being particularly suitable. The effective amount of antistatic agent is in the range from 0.05 to 3% by weight. Another preferred antistatic agent is glyceryl monostearate.

The invention furthermore relates to a process for the production of the multilayer film according to the invention by the coextrusion process known per se.

In this process, as is usual in the coextrusion process, the polymer or the polymer mixture of the individual layers is compressed and liquefied together with the hollow particles in an extruder, and the hollow particles and any additives introduced may already be present in the polymer or in the polymer mixture or may be added by the masterbatch technique. The melts corresponding to the individual layers of the film are then coextruded simultaneously through a sheet die (slot die), and the extruded multilayer film is drawn off on one or more draw-off rolls, said film cooling and solidifying. It has proven particularly advantageous to keep the draw-off roll or rolls, by means of which the extruded film is also cooled and solidified, at a temperature of from 20° to 90° C.

The film thus obtained is then stretched longitudinally and transversely with respect to the extrusion direction, which leads to an orientation of the molecular chains. Stretching is effected in the longitudinal direction preferably in a ratio of from 4:1 to 7:1 and in the transverse direction preferably in a ratio of from 7:1 to 11:1. The longitudinal stretching is expediently carried out with the aid of two rolls which run at different speeds depending on the intended stretching ratio, and the transverse stretching is expediently carried out with the aid of an appropriate calliper frame. The temperatures at which longitudinal and transverse stretching are carried out may vary. In general, the longitudinal stretching is carried out preferably at from 100° to 150° C. and the transverse stretching preferably at from 155° to 190° C.

The biaxial stretching of the film is followed by heat-setting (heat treatment) of said film, the film being kept at a temperature of from 100° to 160° C. for from about 0.5 to 10 seconds. The film is then wound up in a conventional manner using a winding means.

If necessary, one or both surfaces of the film can be corona-treated or flame-treated by one of the known methods after the biaxial stretching.

In the case of the corona treatment, it is expedient to pass the film between two conductor elements serving as electrodes, the voltage applied between the electrodes, in general an ac voltage (about 10 to 20 kV and 20 to 40 kHz), being so high that spray or corona discharges can take place. As a result of the spray or corona discharge, the air above the film surface is ionized and reacts with the molecules of the film surface so that polar inclusions are formed in the essentially nonpolar polymer matrix.

For a flame treatment with a polarized flame (cf. U.S. Pat. No. 4,622,237), an electric dc voltage is applied between a burner (negative pole) and a cooling roll. The magnitude of the applied voltage is from 500 to 3000 V, preferably in the range from 1500 to 2000 V. As a result of the applied voltage, the ionized atoms are greatly accelerated and strike the polymer surface with higher kinetic energy. The chemical bonds within the polymer molecule are more easily broken, and the formation of free radicals takes place more rapidly. The thermal stress of the polymer here is far smaller than in the case of the standard flame treatment, and it is possible to obtain films in which the sealing properties of the treated side are even better than those of the untreated side.

The hollow particles are incorporated either in pure form or as granulated masterbatch into the top layer or top layers of the film by premixing the polyolefin granules or polyolefin powder of the top layer or layers with the hollow particles and then feeding the mixture to the extruder. In the extruder, the components are further mixed and are heated to the processing temperature. In general, the extrusion temperature for the top layer or layers is below the glass transition temperature and the Vicat softening temperature of the polymer of the hollow particle. In general, the extrusion temperature for the top layer or layers is at least 10° C., preferably from 15° to 180° C., in particular from 20° to 150° C., below the $T_G$ or the $T_V$ of the polymer of the hollow particles.

The hollow particles are present in the top layer in the form of finely divided particles. They act as antiblocking agents.

Compared with known films having a low coefficient of friction, the film according to the invention has improved gloss and haze and is also distinguished by a low coefficient of friction and by little surface roughness. The coefficient of sliding friction of lubricant-free embodiments of the films according to the invention is in general in the range from 0.3 to 0.7, preferably from 0.3 to 0.5. Films which additionally contain a lubricant, such as, for example, fatty amide, in particular erucamide, have an even lower coefficient of sliding friction. In the case of the film according to the invention containing erucamide in the base layer, said coefficient is in general in the range from 0.05 to 0.3, preferably from 0.1 to 0.2. The gloss of the film according to the invention is in the range from 90 to 130, preferably from 105 to 130. The haze of the transparent embodiments is in the range from 0.9 to 3.0, preferably in the range from 0.9 to 2.0.

The invention is now illustrated in more detail with reference to Examples.

A. Preparation of the incompatible polymer

EXAMPLE 1

A clean and dry 1.5 dm$^3$ polymerization reactor with a stirrer was flushed with nitrogen and then with ethylene and filled with a solution of 712 g of norbornene in 150 cm$^3$ of toluene. The reactor was then brought to a temperature of 90° C. while stirring, and ethylene at 1 bar was forced in.

5 cm$^3$ of a solution of methylalumoxane in toluene (10.1% by weight of methylalumoxane having a molecular weight of 1300 g/mol according to cryoscopic determination) were then metered into the reactor and the mixture was stirred for 15 minutes at 90° C., the ethylene pressure being kept at 1 bar by further metering (saturation of the solution with ethylene). At the same time, 5.5 mg of isopropylene (cyclopentadienyl) (1-idenyl)zirconium dichloride were dissolved in 5 cm$^3$ of a solution of methylalumoxane in toluene (for concentration and quality, see above), and preactivated by allowing to stand for 15 minutes. The solution of the complex was then metered into the reactor. Polymerization was then carried out for 2 hours at 90° C. while stirring (750 rpm), the ethylene pressure being kept at 1 bar by further metering. The reactor content was then rapidly discharged into a stirred vessel in which 10 cm$^3$ of isopropanol had been initially introduced. This mixture was then added dropwise to 2 dm$^3$ of acetone, after which the suspended polymeric solid was filtered off. The polymer filtered off was then added to 1000 cm$^3$ of a mixture of two parts of 3 normal hydrochloric acid and one part of ethanol, and this suspension was stirred for 2 hours. The polymer was then filtered off again, washed neutral with water and dried at 80° C. and 0.2 bar for 15 hours. 165 g of product were obtained. The measured glass transition temperature $T_g$ of the product was 276° C. The viscosity number was 52 ml/g.

B. Preparation of the hollow particles

EXAMPLE 2

In a spray drier (Mini Spray Dryer, Büchi 190), the polymer from Example 1 in solution in toluene is atomized as described below, under the following conditions.

Flow rate (N2): 500 l (S.T.P.)/h
Pump delivery: 4 ml/min
Aspirator: 10
Preliminary $N_2$ pressure: 150 mbar
Filter pressure: 32.5 mbar
3% strength solution of the polymer from Example 1 in toluene
Inlet temperature: 130° C., outlet temperature: 85° C.
Mean diameter of the resuspended particles $d_n$=4 μm; $d_w/d_n$= 1.7

C. Production of the films according to the invention

EXAMPLE 3

A three-layer film having a total thickness of 20 μm and an ABA layer structure was produced by coextrusion and subsequent stepwise orientation in the longitudinal and transverse direction, i.e. the base layer B was surrounded by two identical top layers A.

Before being wound up, the film was subjected to a corona treatment on one side, i.e. the side facing the roll. The side facing the roll is that side of the film which rests on the first draw-off roll. The surface tension on this side was from 39 to 40 mN/m as a result of this treatment. All layers contained 0.13% by weight of pentaerythrityl tetrakis-4-(3, 5-di-tert-butyl-4-hydroxyphenyl)propionate (®Irganox 1010) for stabilization and 0.06% by weight of calcium stearate as a neutralizing agent.

The base layer B comprised essentially a polypropylene homopolymer having a n-heptane-soluble fraction of 4% by weight and a melting range of from 160° to 162° C. The melt flow index of the polypropylene homopolymer was 3.4 g/10 min at 230° C. and 21.6N load (DIN 53 735). The base layer contained 0.12% by weight of erucamide having a melting range of from 78° to 82° C. and 0.12% by weight of N,N-bis-ethoxyalkylamine (®Armostat 300).

The polyolefinic top layers comprised essentially an ethylene/propylene/1-butene terpolymer containing 3.5% by weight of ethylene, 88.5% by weight of propylene and 8% by weight of 1-butene. The top layers contained 0.05% by weight of the hollow particles described in Example 2. The thickness of each of the top layers was 0.8 $\mu$m.

EXAMPLE 4

Example 1 was repeated. However, the top layer contained 0.15% by weight of the hollow particles prepared in Example 2.

Comparative Example 1

Example 3 was repeated. However, 0.15% by weight of a crosslinked silicone resin powder having a mean particle diameter of 2 $\mu$m (®Tospearl 20 from Toshiba Silicone Co., Ltd.) was used as an antiblocking agent.

Comparative Example 2

Example 3 was repeated. However, 0.15% by weight of an organically coated silica having a mean particle diameter of 2 $\mu$m (®Sylobloc 44 from Grace) was used as an antiblocking agent.

Comparative Example 3

Comparative Example 1 was repeated. However, the top layer contained 0.33% by weight of the silicone resin powder.

Comparative Example 4

Comparative Example 2 was repeated. However, the top layer contained 0.33% by weight of the coated silica.

The properties of the films according to the Examples and Comparative Examples are summarized in the Table below.

The following methods of measurements were used for characterizing the raw materials and the films:
Melt flow index
 The melt flow index was measured similarly to DIN 53 735 at 21.6N load and 230° C.
Melting point
 DSC measurement, maximum of the melting curve, heating rate 20° C./min.
Determination of the minimum sealing temperature
 Heat-sealed samples (seal 20 mm×100 mm) are produced using the HSG/ET sealing apparatus from Brugger, by sealing a film at different temperatures with the aid of two heated sealing jaws at a sealing pressure of 10N/cm$^2$ and in a sealing time of 0.5 s. 15 mm wide test strips are cut from the sealed samples. The ultimate seal strength, i.e. the force required to separate the test strips, is determined using a tensile test machine at a take-off speed of 200 mm/min, the plane of the seal making a right angle with the direction of tension. The minimum sealing temperature is the temperature at which a seal strength of at least 0.5N/115 min is reached.
Seal strength
 For the determination, two 15 mm wide film strips were placed one on top of the other and sealed at 130° C. in a sealing time of 0.5 s and at a sealing pressure of 1.5N/mm$^2$ (apparatus: Brugger type NDS, sealing jaw heated on one side). The seal strength was determined by the T-Peel method.
Friction
 The friction was determined similarly to DIN 53 375. The coefficient of sliding friction was measured 14 days after production.
Surface tension
 The surface tension was determined by means of the so-called ink method (DIN 53 364).
Roughness
 The roughness was determined according to DIN 4768 at a cut-off of 0.25 mm.
Haze
 The haze of the film was measured according to ASTM-D 1003-52. The haze according to Hölz was determined similarly to ASTM-D 1003-52, but, in order to utilize the optimum measuring range, the measurement was carried out on four film layers one on top of the other and a 1° slit diaphragm was used instead of a 4° pinhole diaphragm.
Gloss
 The gloss was determined according to DIN 67 530. The reflector value was measured, as an optical characteristic for the surface of a film. On the basis of standards ASTM-D 523-78 and ISO 2813, the angle of incidence was set at 20° or 60°. A ray of light strikes the flat test surface at the set angle of incidence and is reflected or scattered by said surface. The light rays striking the photoelectronic receiver are displayed as a proportional electrical quantity. The measured value is dimensionless and must be stated together with the angle of incidence.
Density
 The density is determined according to DIN 53 479, Method A.
Opacity and whiteness
 The opacity and the whiteness are determined with the aid of the "ELREPHO" electrical reflectance photometer from Zeiss, Oberkochem (DE), standard illuminant C, 2° standard observer. The opacity is determined according to DIN 53 146. The whiteness is defined as WG=RY+3RZ−3RX. WG=whiteness; RY, RZ, RX=corresponding reflectance factors with the use of the Y, Z and X colorimetric filter. A pellet of barium sulfate (DIN 5033, Part 9) is used as a white standard. A detailed description is given, for example, in Hansl Loos "Farbmessung" [Color Measurement], Verlag Beruf und Schule, Itzehoe (1989).
Light transmittance
 The light transmittance is measured similarly to ASTM-D 1003-77.
Average molecular weight and molecular weight dispersity The average molecular weights ($M_w$, $M_n$) and the average molecular weight dispersity ($M_w/M_n$) were determined similarly to DIN 55 672, Part 1, by means of gel permeation chromatography. Instead of THF, orthodichlorobenzene was used as the eluent. Since the olefinic polymers to be investigated are insoluble at room temperature, the entire measurement is carried out at elevated temperature (~135° C.).

Glass transition temperature

The samples were investigated with the aid of DSC (Differential Scanning Calorimetry). The heating rate was 20K/min. In order to eliminate the thermal history of the sample, the sample was first heated to above the glass transition temperature $T_G$ in the DSC apparatus, cooled rapidly and then heated again (second heat-up). The glass transition temperature was taken as half the step height from the thermogram for the second heat-up.

Vicat softening temperature

The Vicat softening temperature VST/B/120 was measured according to 150 306, DIN 53 460.

Photon correlation spectroscopy

The measurement was carried out as described in J. P. Fischer "Progress in Colloid and Polymer Science", 77, pages 180–194, 1988.

Particle size distribution

The number average $d_n$ and weight average $d_w$ of the particle size are determined from the particle size distribution determined by PCS, according to the usual mathematical methods.

TABLE

|  | Gloss | | Haze | | Minimum sealing temperature MST [°C.] 10 N/cm$^2$; 0.5 s | | Coefficient of sliding friction | Roughness | |
| --- | --- | --- | --- | --- | --- | --- | --- | --- | --- |
|  | Measuring angle 20° C. | Measuring angle 60° | Hölz 4-layer | ASTM-D 1003 1-layer | A./.A | B./.B | A./.B | A./.A | B./.B |
| E3 | 120 | 145 | 22 | 1.4 | 112 | 118 | 0.18 | 0.65 | 0.51 |
| E4 | 115 | 140 | 25 | 1.8 | 114 | 120 | 0.17 | 0.70 | 0.78 |
| CE1 | 108 | 135 | 39 | 3.9 | 116 | 120 | 0.17 | 0.55 | 0.58 |
| CE2 | 105 | 135 | 35 | 3.5 | 112 | 118 | 0.32 | 1.1 | 1.23 |
| CE3 | 102 | 133 | 43 | 4.2 | 116 | 120 | 0.17 | 0.60 | 0.77 |
| CE4 | 102 | 128 | 41 | 3.7 | 116 | 120 | 0.3 | 1.3 | 1.45 |

E = Example
CE = Comparative Example
A = Roll side
B = Air side

I claim:

1. An oriented polyolefin film having a coefficient of friction of less than 0.7 comprising at least one polyolefinic base layer and one sealable polyolefinic top layer, and wherein the top layer contains hollow particles which act as antiblocking agents and comprise a polymer which is incompatible with the polyolefin of the top layer.

2. The film as claimed in claim 1, wherein the sealable top layer contains from 70 to <100% by weight of a polymer of olefins having 2 to 10 carbon atoms, based on the weight of the top layer.

3. The film as claimed in claim 1, wherein the base layer contains at least 60% by weight of a polyolefin, based in each case on the weight of the base layer.

4. The film as claimed claim 1, wherein the top layer contains not more than 5% by weight based on the weight of the top layer, of hollow particles.

5. The film as claimed in claim 1, wherein the hollow particles are essentially spherical and have essentially no concave surface segments.

6. The film as claimed in claim 1, wherein the hollow particles have from 1 to 20 concave surface segments.

7. The film as claimed in claim 6, wherein the volume enclosed in the hollow particle tends toward zero and the hollow particle comprises polymer skin.

8. The film as claimed in claim 1, wherein at least 90% of the hollow particles have a maximum particle diameter in the range from 0.2 to 20 µm.

9. The film as claimed in claim 1, wherein the incompatible polymer is syndiotactic polystyrene, polyphenylene sulfide (PPS), polyetherketone (PEK), polyamide (PA), polyethylene terephthalate (PET), polybutylene terephthalate (PBT), polyaramid, polyimide, halogenated polymer, amorphous or semicrystalline cycloolefin polymer or a metathetical polymer.

10. The film as claimed in claim 1, wherein the base layer contains pigments.

11. The film as claimed in claim 1, wherein the density of the film is from 0.4 to 1.5 g/cm$^3$.

12. The film as claimed in claim 1, wherein the top layer has a thickness of from 0.2 to 2 µm.

13. The film as claimed in claim 1, wherein the multilayer film is white or opaque and has a light transmittance, measured according to ASTM-D 1039-77, of not more than 50%.

14. A laminate comprising a multilayer polyolefin film as claimed in claim 1 including paper board or a further film of a thermoplastic.

15. An oriented polyolefin film as in claim 1 wherein the coefficient of friction is 0.3 to 0.5.

16. An oriented polyolefin film as in claim 1 wherein the coefficient of fraction is 0.05 to 0.3.

17. An oriented polyolefin film as in claim 16 wherein the coefficient of friction is 0.1 to 0.2.

18. A process for the production of a film as claimed in claim 1, in which the polymers or polymer mixtures forming the film are compressed and heated in an extruder, the melt or melts is or are then extruded through a sheet die, the film thus obtained is drawn off on one or more rolls and the film is then oriented and, if required, heat-set and surface-treated, wherein the extrusion temperature is below the glass transition temperature of the incompatible polymer.

19. A polymer mixture comprising polyolefin and from 0.001 to <2% by weight, based on the polymer mixture, of hollow particles comprising incompatible polymer.

* * * * *

UNITED STATES PATENT AND TRADEMARK OFFICE
CERTIFICATE OF CORRECTION

PATENT NO. : 5,861,208
DATED : Jan. 19, 1999
INVENTOR(S) : Micheal Schreck

It is certified that error appears in the above-identified patent and that said Letters Patent is hereby corrected as shown below:

Column 1, line 8, "articles" should read -- particles --.

Column 11, line 56, "eight" should read -- weight --.

Column 16, line 9, "0.5N/115" should read -- 0.5N/15 --.

Column 17, line 60 (claim 4, line 1), "claimed claim" should read -- claimed in claim --.

Signed and Sealed this

Eighth Day of June, 1999

Q. TODD DICKINSON

Attest:

Attesting Officer

Acting Commissioner of Patents and Trademarks